United States Patent
Bhuta et al.

[15] 3,685,008
[45] Aug. 15, 1972

[54] ACOUSTO-OPTICAL ECHO IMAGING METHOD AND APPARATUS

[72] Inventors: Pravin G. Bhuta, Torrence; Robert Aprahamian, Los Angeles, both of Calif.

[73] Assignee: TRW Inc., Redondo Beach, Calif.

[22] Filed: May 29, 1969

[21] Appl. No.: 829,000

[52] U.S. Cl..................340/3 R, 73/67.5 R, 73/67.7, 178/DIG. 18, 340/5 MP
[51] Int. Cl..............................................G01s 9/66
[58] Field of Search........340/1, 3, 5 MP, 5 H, 3 E, 5, 340/5 D, 6; 332/7.51; 73/67.5–67.7; 178/DIG. 18

[56] References Cited

UNITED STATES PATENTS

| | | | |
|---|---|---|---|
| 3,400,363 | 9/1968 | Silverman | 340/3 |
| 3,488,438 | 1/1970 | Korpel | 340/5 X |
| 2,898,589 | 8/1959 | Abbott | 340/6 X |
| 3,278,891 | 10/1966 | Cowdery | 340/6 |

*Primary Examiner*—Richard A. Farley
*Attorney*—Daniel T. Anderson, Donald R. Nyhagen and Jerry A. Dinardo

[57] ABSTRACT

An acousto-optical echo imaging method and apparatus for examining objects, particularly submerged objects and the interior of objects which are optically opaque. The object to be examined is acoustically coupled to an acoustic source of fixed frequency and to an acoustic wave transmission medium in a manner such that acoustic wave energy from the source is transmitted to the object and then reflected from the object to the acoustic medium to produce within the medium distorted acoustic waves containing information defining an image of the object. This acoustic wave information is transformed to equivalent light information by a light-sound wave interaction yielding refracted light rays which may be magnified to produce an observable image of the object or otherwise processed to produce an output related to the acoustic characteristics of the object. An acousto-optical method and apparatus for examining objects, such as soil, characterized by relatively high acoustic loss, wherein relatively low frequency acoustic wave energy is utilized to probe the object under examination in order to minimize acoustic attenuation within the object, and the distorted acoustic wave energy emerging from the object is subjected to an acoustic wave reconstruction process which increases the acoustic probe frequency suitable for acousto-optical imaging.

17 Claims, 10 Drawing Figures

Robert Aprahamian
Pravin G. Bhuta
INVENTORS

BY
ATTORNEY

Robert Aprahamian
Pravin G. Bhuta
INVENTORS

ATTORNEY

PATENTED AUG 15 1972 3,685,008

Robert Aprahamian
Pravin G. Bhuta
INVENTORS

BY
ATTORNEY

ACOUSTO-OPTICAL ECHO IMAGING METHOD AND APPARATUS

RELATED APPLICATIONS

Reference is made herein to copending application Ser. No. 803,291, filed Feb. 28, 1969, and entitled "Acoustic-Optical Method and Apparatus".

BACKGROUND OF THE INVENTION

1. Field of the Invention

This invention relates generally to the field of technology, referred to herein as acousto-optics, which involves the transformation of acoustic wave information to equivalent light information by the interaction of light waves with acoustic waves. More particularly, the invention relates to a novel acousto-optical echo imaging method and apparatus for examining objects, particularly submerged objects and objects which are optically opaque. The invention relates also to an acousto-optical method and apparatus embodying a novel acoustic wave reconstruction process for examining objects, such as soil, characterized by relatively high acoustic loss.

2. Prior Art

One of the known techniques of examining objects which may be optically opaque involves an acousto-optical imaging technique known as ultrasonic imaging. According to this technique, the object to be examined is acoustically coupled to an acoustic wave transmission medium and is then impinged by acoustic wave energy. The object scatters or distorts the incident acoustic wave energy in a manner such that the wave energy emerging fro the object into the acoustic medium produces within the medium distorted acoustic waves containing information describing or defining an image of the object. This acoustic wave information is converted or transformed into an optical image of the object by means of an electronic ultrasonic image converter. Ultrasonic imaging systems of this type are well known in the art and have been described in various prior art publications. One of these publications is in the National Academy of Sciences, Report No. NRG-MAC-2016, entitled "Ultrasonic Imaging" by R. S. Mackay et al.

The primary advantage of ultrasonic imaging over conventional optical imaging resides in its ability to image the interior of optically opaque objects. This capability stems from the fact that the acoustic energy utilized in ultrasonic imaging penetrates and is scattered or distorted by optically opaque materials in much the same way as light waves penetrate and are scattered by optically transparent materials. As a consequence, the distorted acoustic wave energy emerging from an optically opaque object contains information defining each interior point of the object in much the same way that the light waves transmitted through an optically transparent object contain information defining each interior point of the transparent object. In a case of a conventional optical imaging system, the distorted light waves emerging from the object are focused by a suitable optical system to image the object. In the existing ultrasonic imaging systems, on the other hand, the distorted acoustic waves emerging from the object are converted to an optical image of the object by an electronic ultrasonic image converter. The ability of ultrasonic imaging systems to image the interior of optically opaque objects adapts such systems to a wide variety of highly useful applications. One of these applications involves the inspection of opaque objects for internal cracks and other flaws.

The present invention is concerned primarily with the transformation or conversion of the distorted acoustic wave energy emerging from the object being examined to an observable optical image of the object or to some other usable output information. As noted above, in the existing ultrasonic imaging systems, conversions of the distorted acoustic wave energy emerging from the object being examined to an optical image of the object is accomplished with the aid of an electronic image converter. This converter has a cathode ray tube on which the image is produced. The object to be examined is placed within an acoustic wave coupler containing an acoustic wave transmission medium, such as water. Acoustic wave energy is then transmitted through the object into the acoustic medium. During passage of the acoustic waves through the object, the waves are scattered or distorted by each point of the object in such a way that each such point becomes, in effect, a separate acoustic wave source. The acoustic waves emanating from these separate point sources within the object combine to produce in the acoustic medium the distorted acoustic waves describing or defining each point source. These distorted acoustic waves pass through an acoustic lens which focuses the distorted acoustic wave energy upon an extended area of piezoelectric material which is scanned by an electron beam to generate a fluctuating electrical signal corresponding to the acoustic image information incident on the piezoelectric material. The fluctuating electrical signal is applied to a cathode ray tube to produce on the fact of the tube an optical image of the object.

Such electronic ultrasonic image conversion systems are quite complex and costly and suffer from various other disadvantages which need not be elaborated on here. Suffice it to say that the present invention seeks to overcome these disadvantages by utilizing the interaction of light waves with the distorted acoustic waves from the object being examined to convert the emerging distorted acoustic wave image information to an observable optical image of the object or to some other useful output.

The basic principle and mechanics of light-sound wave interaction has been recognized and studied for a number of years. By way of example, the results of some of these studies are contained in the following references:

1. Debye, P. and Sears, F. W., Proc. National Academy of Science, Washington, 18, (1932), p. 409;

2. Adler, R., "Interaction Between Light and Sound", IEEE Spectrum, p. 42, May 1967; and 3. Korpel, A., "Visualization of the Cross Section of a Sound Beam by Bragg Diffraction of Light", Applied Physics Letters, Vol. 9, No. 12, Dec. 1966.

Another prior art publication dealing with the interaction of light and sound waves is the Adler U.S. Pat. No. 3,373,380. This patent discloses an acousto-optical system which utilizes light-sound wave interaction to transform an electrical signal into an equivalent light signal.

Generally speaking, the basic technique of light-sound wave interaction involves the generation of acoustic waves within an acoustic wave coupler, sometimes referred to as a Bragg cell, containing an acoustic wave transmission medium. A beam of monochromatic light is transmitted through this acoustic medium transverse to the propagation vector of the acoustic wave within the medium so that the light wave fronts impinge the acoustic wave fronts. The light wave fronts are diffracted and modulated by the acoustic waves in such a way that the refracted light waves emerging from the medium produce a light field which is modulated in accordance with the acoustic input of the wave coupler.

In the acousto-optical signal translation system disclosed in the Adler patent, an acoustic transducer is mounted on one end of the wave coupler and is energized by the electrical signal to be translated or convered into a light signal. This electrical signal may be amplitude or frequency modulated. When thus energized, the transducer generates within the wave transmission medium of the wave coupler acoustic waves which fluctuates in frequency or amplitude according to the modulated electrical signal impressed on the transducer. The light source of the Adler system is a laser whose collimated beam of spatially coherent monochromatic light is directed through the wave coupler to a following projecting telescope. This telescope focuses the refracted light waves emerging from the wave coupler onto a light sensitive medium to produce a concentrated light field or spot on the medium. During passage of the light beam through the wave coupler, the light waves are modulated by the acoustic waves to provide at the light sensitive medium a modulated light field or spot whose intensity fluctuates in accordance with the modulation of the transducer input signal. The primary contribution of the Adler system resides in its organization whereby the light waves impinge the acoustic waves approximately at the Bragg angle to yield an optimum light output signal. This organization involves, in part, precise orientation of the laser axis at the Bragg angle relative to the propagation vector of the acoustic waves through the wave coupler.

The earlier mentioned copending application discloses a novel acousto-optical imaging method and apparatus embodying an improved technique for converting or transforming to an optical image or other useful optical output, the distorted acoustic wave information resulting from transmission of acoustic wave energy of fixed frequency through an object into an acoustic wave transmission medium. This transformation of distorted acoustic wave information to equivalent light information is accomplished directly by a light-sound wave interaction rather than indirectly with the aid of an electronic ultrasonic image converter. Such light-sound wave interaction yields refracted light rays which may be magnified to produce an observable image of the object or otherwise processed to provide usable output information corresponding to the acoustic information represented by the distorted acoustic waves.

More specifically, the copending invention involves acoustic coupling of the object to an acoustic source and an acoustic wave transmission medium in a manner such that acoustic wave energy from the source is transmitted to the object and then from the object to the acoustic medium. During their transmission through the object, the acoustic waves are distorted or scattered by each point of the object in a manner such that each such point becomes, in effect, a separate point acoustic source. The acoustic waves from the separate point sources combine to produce in the acoustic medium the distorted acoustic waves which thus comprise, effectively, the sum or resultant of the acoustic waves from all of the point sources. As a consequence, the distorted acoustic waves traveling from the object through the acoustic medium contain or represent acoustic information defining each point of the object.

Transformation or conversion of this distorted acoustic wave information to equivalent light information, such as an image of the object, is accomplished by directing a beam of monochromatic light through the acoustic medium, transverse to the propagation vector of the acoustic waves through the medium. The wave fronts of light impinge the traveling distorted acoustic wave fronts within the medium at an oblique angle, preferably the Bragg angle. This causes the light waves to be refracted by the distorted acoustic waves in a manner such that the refracted light waves emerging from the acoustic medium define an optical image of the object which may be magnified by an appropriate optical system to produce an observable image of the object within an external viewing plane. The optical system may be adjustable to focus any selected cross-sectional plane of the object within the viewing plane and thereby produce in the latter plane an image of the selected cross-sectional object plane. As will appear from the ensuing description, the refracted light waves emerging from the acoustic medium may be transformed to a usable output other than an observable optical image of the object being examined.

According to the preferred practice of the copending invention, the acousto-optical method and apparatus are practiced and organized in such a way that the light-sound wave interaction which occurs within the acoustic medium satisfies the Bragg angle at a large number of points within the interaction zone. As will be immediately recognized by those versed in the art, this results in maximum refraction of the light waves by the distorted acoustic waves, and thereby, maximum intensity and definition of the resulting optical image. In this regard, it should be noted that a unique feature of the copending invention resides in the use of a tapered light beam which yields the Bragg angle at a large number of points within the light-sound wave interaction zone. Such a tapered light beam presents a two-fold advantage. First, it eliminates the necessity of precise orientation of the light source at the Bragg angle relative to the propagation vector of the acoustic waves through the acoustic medium, as required in the Adler patent. Secondly, it provides an image of higher quality.

SUMMARY OF THE INVENTION

The present invention provides an acousto-optical echo imaging method and system wherein acoustic wave energy from an acoustic source is transmitted to the object to be examined and then reflected from the object to a receiving station. During their transmission through the object, the acoustic waves are distorted or scattered by each point of the object in a manner such that each such point becomes, in effect, a separate point acoustic source. The acoustic waves from the separate point sources combine to produce distorted acoustic waves which comprise, effectively, the sum or resultant of the acoustic waves from all of the point sources and contain acoustic information defining an image of the object. The distorted reflected acoustic wave energy arriving at the receiving station is utilized to produce within an acoustic wave transmission medium equivalent distorted acoustic waves containing essentially the same image information as the reflected waves.

This equivalent distorted acoustic wave information is converted to an optical image of the object by directing a beam of monochromatic light through the acoustic medium, transverse to the propagation vector of the acoustic waves through the medium. The wave fronts of light impinge the traveling distorted acoustic wave fronts within the medium at an oblique angle, preferably the Bragg angle, in a manner such that the refracted light waves emerging from the acoustic medium define an optical image of the object. These light rays pass through an optical system which is adjustable to focus any selected cross-sectional plane of the object in a viewing plane and thereby produce in the latter plane an observable image of the selected cross-sectional object plane. Transformation of the acoustic image information to an optical image may occur at the receiving station or at a remote imaging station, such as an aircraft or remote ground station, by transmitting the reflected acoustic wave information arriving at the receiving station to the remote imaging station.

Two useful applications of the invention are disclosed, one involving remote examination of the objects submerged in water and the other examination of subterranean earth formations, such as mineral deposits, tunnels, and the like, from the ground surface. Another aspect of the invention, which is particularly beneficial in the latter application, involves an acoustic image reconstruction technique. This technique permits the use of low frequency acoustic energy to probe the object being examined, such as soil, so as to minimize attenuation of the acoustic energy by the object, and conversion of the resulting low frequency acoustic image information to equivalent higher frequency acoustic information suitable for acousto-optical transformation to an observable image.

DESCRIPTION OF THE PREFERRED EMBODIMENTS

Figures 1, 2, 3:
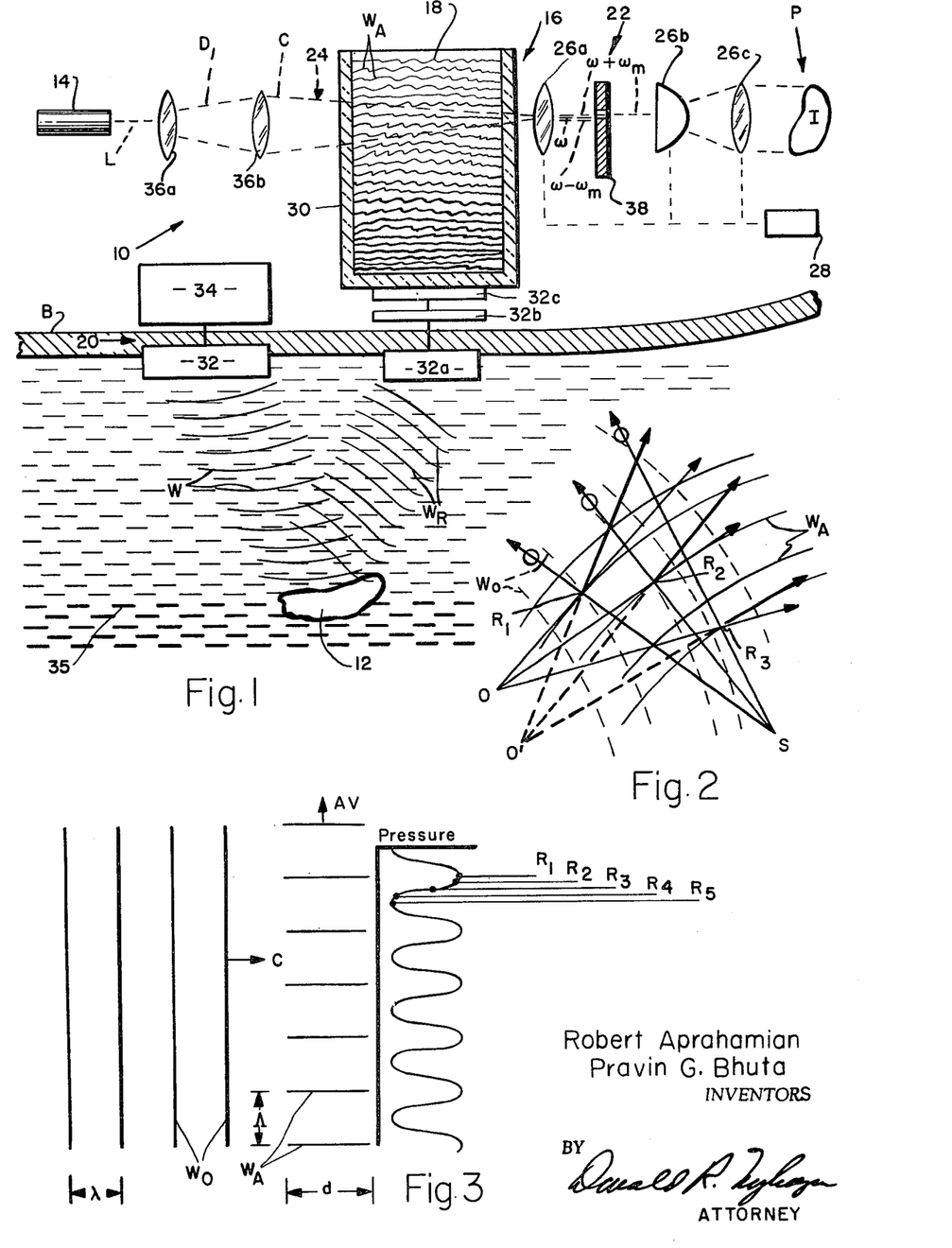
FIG. 1 diagrammatically illustrates an acousto-optical echo imaging system according to the invention.
FIG. 2 depicts the basic acousto-optical imaging principle of the invention.
FIG. 3 depicts an enlarged portion of FIG. 2 as well as certain acoustic pressure variations which are involved in the acousto-optical imaging invention.

Turning first to FIG. 1 of these drawings, there is illustrated acousto-optical echo imaging apparatus 10 according to the invention for examining or inspecting an object 12 which may be optically opaque. In general terms, the apparatus comprises a monochromatic light source 14, a wave coupler 16, which is transparent to the light from the source 14 and embodies an acoustic wave transmission medium 18, an acoustic energy source 20, and an optical system 22. At this point, it should be noted that as used in the present disclosure, the terms "light", "sound", "acoustic waves", and other similar expressions, are most general. That is to say, the term "light" refers to both visible and invisible electromagnetic radiation and embraces wave energy at wavelength either within, above, or below the visible portion of the spectrum. Similarly, the terms "sound" and "acoustic waves" encompass all acoustic wave frequencies including subaudible, audible, and ultrasonic frequencies.

The object 12, wave coupler 16, and acoustic source 20 are acoustically coupled in such a way that acoustic wave energy is transmitted from the acoustic source to the object and then reflected from the object back to the wave coupler. The acoustic wave energy incident on the object is distorted or scattered by the object so that the acoustic wave energy is reflected from the object in the form of distorted acoustic waves $W_R$ containing information defining an image of the object. The reflected acoustic waves $W_R$ returning to the wave coupler are effectively transmitted to the acoustic medium 18 within the coupler in such a way as to create within the medium distorted acoustic waves $W_A$ equivalent to and containing the same image information as the reflected waves. A light beam 24 from the light source 14 is transmitted through the wave coupler 16, transverse to the propagation vector of the acoustic waves $W_A$ through the medium. The light wave fronts of the light beam impinge the wave fronts of the distorted acoustic waves within the acoustic medium and are refracted in the manner hereinafter explained. In this regard, it will become evident from the ensuing description that refraction of the light waves occurs because of the variations in the density of the acoustic medium across the acoustic waves $W_A$ resulting from the acoustically induced pressure variations which constitute the acoustic waves. The light wave fronts impinge the distorted acoustic wave fronts at an oblique angle, preferably the Bragg angle, such that the light energy emerging from the acoustic medium is composed of refracted light rays which define an optical image of the object being examined.

As will become evident from the ensuing description, selected refracted light rays emerging from the acoustic medium 18 may be utilized in various ways, depending upon the form of output information desired. In the particular applications discussed in this disclosure, the refracted light rays pass through the optical system 22. This optical system magnifies selected emerging light rays so as to produce in an external viewing plane P an observable image I of the object 12. The optical system may be equipped with a focus adjustment 28 for focusing the optical system on any selected cross-sectional plane of the object so as to image this selected plane in the external viewing plane P. The particular optical system shown is essentially a telescope optical system including a microscope objective 26a, a cylindrical magnifying lens 26b, and a final simple lens 26c.

It will be recalled from the earlier discussion that the phenomena of light-sound wave interaction and ultrasonic imaging using an ultrasonic acoustic or image converter have been known and studied for a number of years. Accordingly, it is unnecessary to elaborate in detail on these phenomena in the present disclosure. However, in the interest of a full and complete understanding with the present invention, it is deemed advisable to discuss briefly some of the principles involved in these phenomena.

First consider the actions which occur when acoustic waves are transmitted through an object into an acoustic wave transmission medium. This, of course, requires acoustic coupling of the acoustic wave source or generator, the object, and the acoustic medium. As noted earlier and explained in greater detail in the later description, this acoustic coupling may be accomplished in various ways. Also, various acoustic media may be employed. In the particular embodiment of the invention illustrated in FIG. 1, the acoustic medium 18 is a liquid, such as water, contained within a tank 30 which, together with the liquid, constitutes the wave coupler or Bragg cell 16. The acoustic medium 18 and the walls of the tank 30 are transparent to the light from the light source 14. The light source illustrated is a laser, and the acoustic medium 18 and the walls of the tank 30 are optically transparent. The acoustic wave source or generator 20 comprises a transducer 32 connected to a driver 34 which energizes the transducer at a fixed frequency. The transducer 32 and wave coupler 16 are acoustically coupled to the object 12 through an acoustic wave transmission body 35 in a manner such that the transducer generates within the body acoustic waves W which impinge the object and are then reflected from the object back through the acoustic body to the wave coupler in the form of the distorted reflected waves $W_R$ to produce the distorted waves $W_A$ within the acoustic medium 18.

The acoustic waves W which impinge the object 12 behave in much the same way as light waves impinging an optically transparent object. That is to say, the acoustic waves are distorted, i.e. defracted or scattered, at each point within the object in such a way that each point effectively becomes a separate point acoustic source from which acoustic waves emanate. As a consequence, the distorted acoustic wave energy $W_R$ reflected from the object 12 into the acoustic body 35 and the resulting distorted acoustic waves $W_A$ produced within the acoustic medium 18 are the sum or resultant of the acoustic waves from all of the separate point sources of the object and have a complex wave pattern which constitutes acoustic information describing or defining each point of the object and hence an image of the object.

This acoustic information is transformed or converted into equivalent light information by the acousto-optical transformation technique disclosed in the earlier mentioned copending application, Ser. No. 803,291. This technique involves interaction of the wave fronts of the light beam 24 with the wave fronts of the distorted acoustic wave $W_A$ within the acoustic medium 18. In the particular embodiment shown in FIG. 1, the light information is optically processed by the optical system 22 to produce the image I of the object within the viewing plane P. To understand this acousto-optical transformation or conversion, first consider FIG. 2, in which S is a point source of acoustic waves $W_A$ of fixed frequency within a surrounding acoustic wave transmission medium and O is a point source of monochromatic light waves $W_o$. In this figure, the acoustic waves and light waves are illustrated as curved lines which represent the traveling acoustic and light wave fronts. The light wave fronts impinge the acoustic wave fronts within the acoustic medium as depicted in the figure. Consider also FIG. 3, which represents a narrow incremental band or column of the acoustic waves and a narrow incremental band or column of the light waves in FIG. 2. As is well known to those versed in the art and depicted in the graph at the right hand side of FIG. 3, the acoustic waves $W_A$ within the acoustic column constitute cyclic compression and rarefaction or relief zones within the acoustic wave transmission medium and include regions $R_1$ of maximum compression, regions $R_2$ of partial compression, regions $R_3$ of zero compression, regions $R_4$ of partial relief, and regions $R_5$ of maximum relief. The index of refraction of the acoustic medium is a function of its density, and its density in turn is a function of the pressure of the medium. It is evident, therefore, that the refraction index of the acoustic medium varies progressively across each acoustic wave. The propagation velocity C of the light waves $W_o$ through the acoustic medium is a function of the refraction index according to the equation $$C = C_o/\nu \qquad (1)$$

where
$C_o$ is the velocity of the light waves in air;
$\nu$ is the refraction index of the acoustic medium. The propagation velocity of light waves through the acoustic medium thus varies across each acoustic wave.

During their passage through the acoustic wave transmission medium, the light waves also undergo a phase shift $\Delta\phi$. This phase shift is expressed by the equation $$\Delta\phi = (2\pi d/\lambda_0)(\Delta\nu) \qquad (2)$$

where
$d$ is the width of the acoustic column;
$\lambda_0$ is the wavelength of the light waves in air;
$\Delta\nu = \nu-1; \nu = 1$ in air.

With this discussion in mind, consider the situation depicted in FIG. 3, wherein the light waves $W_o$ impact the column of acoustic waves $W_A$. Since the acoustic waves travel or propagate through the acoustic medium, the density of the medium and hence its refraction index at any given point along the column fluctuates in cyclic fashion between minimum and maximum values. As a consequence, the light waves $W_o$ are both frequency and phase modulated as they traverse the acoustic column. This modulation phenomena and its consequences are well known. Thus, it is known that if a wave, i.e. a carrier wave, of frequency $\omega$ is modulated by a frequency $\omega_m$, a series of multiple waves or wave components is created including the original carrier wave of frequency $\omega$ and a set of sidebands whose frequencies differ by $\omega_m$ from one another and from the carrier frequency. In the particular situation depicted in FIG. 3, the light waves $W_o$ are modulated by the acoustic waves $W_A$ in such a way that the light emerging from the acoustic column will consist of a carrier component having the frequency $\omega$ of the incident light waves and sidebands of the order N with frequencies $\omega \pm N\omega_m$, where $\omega_m$ is the fixed frequency of the acoustic waves. It can be shown that these sidebands have oblique propagation vectors inclined at the angle $\phi$ relative to the carrier vector according to the equation $$\tan \phi = \pm (N\lambda/\Lambda) \qquad (3)$$

where
- $\lambda$ is the wavelength of the light waves in the acoustic medium;
- $\Lambda$ is the wavelength of the acoustic waves. In other words, the sidebands are uniformly dispersed through an angle equal to the ratio of the wavelength of the light waves to the wavelength of the acoustic waves.

It will be immediately recognized by those versed in the art that this sideband dispersion occurs instantaneously upon impact of the light waves with the acoustic column. As a consequence, a given sideband produced by impact of incident light waves on a compressed region of the acoustic column will eventually enter a relieved or rarefied region of the column. This may cause destructive interference and tend to extinguish the sideband. Such destructive interference of a selected sideband can be reduced by imposing the condition that the lateral spread of this sideband relative to the carrier propagation vector shall not be greater than one-half the width $d$ of the acoustic column. It can be shown that this condition requires $$d << (\Lambda^2/2\lambda |N|)$$

where
- N is the order of the selected sideband, and the angular spread $\phi$ is small such that $\tan \phi \cong \phi$.

Figure 4:
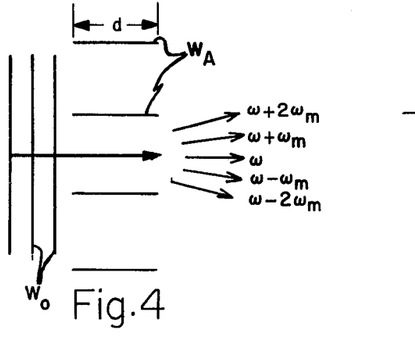
FIG. 4 depicts the so-called Sears-Debye condition.

When this condition obtains, then all of the sidebands of order N and lower order will experience no destructive interference, while all of the sidebands of higher order than N will experience a high degree or total destructive interference. This condition is the well-known Sears-Debye condition and is diagrammatically illustrated in FIG. 4. As will appear from the later description, the present acousto-optical imaging technique may be practiced in such a way that Sears-Debye condition is satisfied. This is hereafter referred to in places as practicing or operating in the Sears-Debye regime.

Figure 5:
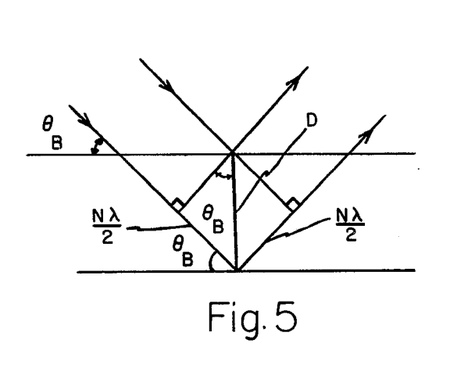
FIG. 5 depicts simple constructive interference of light waves by a diffraction grating.

In addition to the above discussed phenomenon of destructive interference, light-sound wave interaction may also involve constructive interference of the light waves. Such constructive interference involves Bragg reflection. In this regard, it will be recognized by those versed in the art that the acoustic column in FIG. 3 constitutes, in effect, a traveling diffraction grating in which successive isopiestic planes of each acoustic wave $W_A$ effectively constitute successive grating strata. When a light wave impacts such a grating, the wave is reflected from the successive strata. Bragg's law defines the condition under which such a refraction grating will reflect an incident light wave with maximum intensity. More specifically, Bragg's law defines the condition under which the parts of the incident light wave front which reflect from the successive grating strata will recombine in phase. When this condition obtains, constructive interference occurs, and the different parts of the reflected wave front reenforce one another when they combine. FIG. 5 depicts the phenomena of Bragg reflection from two successive strata of a diffraction grating. With respect to this figure, Bragg's law of reflection is expressed mathematically as $$\text{SIN}\,\theta_B = (N\lambda/2D) \qquad (5)$$

where
- $\theta_B$ is the Bragg angle,
- N is an integer, and
- D is the grating distance.

Assume now the situation wherein the width $d$ of the acoustic column is greater than that prescribed in the Sears-Debye condition. In other words $$d >> (\Lambda^2/2\lambda |N|) \qquad (6)$$

where the angular spread $\phi$ (equation 3) is small such that $\tan \phi \cong \phi$. The condition expressed by this equation is referred to as the Bragg condition. It can be demonstrated that when the Bragg condition exists, the light waves entering the acoustic column undergo reflection and refraction by the acoustic waves as well as constructive and destructive interference in such a way that the light emerging from the acoustic column will consist of the carrier and that sideband or those sidebands whose order N satisfy the Bragg equation (6) for the particular width d of the acoustic column through which the light passes. All other sidebands will be cancelled by destructive interference. For example, assume $$d = (\Lambda^2/2 \lambda\, 2) \text{ (i.e. } N = 2) \qquad (7)$$

under these conditions, the only light sideband whose order N will satisfy the Bragg equation (6) is the first order so that the only light emerging from the column will be the carrier and the first order sidebands. If $$d = (\Lambda^2/2 \lambda\, 4) \text{ (i.e. } N = 4) \qquad (8)$$

the light emerging from the acoustic column can consist of the carrier and the first six sidebands whose orders N are $\pm 1, \pm 2,$ and $\pm 3$, respectively, assuming light exists at those Bragg angles. In the ensuing description, practicing or operating under the conditions defined by the Bragg equation (6) is referred to in places as practicing or operating in the Bragg regime. It will become evident to those versed in the art that the present invention may be practical and operated within either the Sears-Debye regime or the Bragg regime. It will become further evident as the description proceeds, however, that maximum image intensity and definition are attained by operating in the Bragg regime. Accordingly, operation in this regime constitutes the preferred practice of the invention.

Figure 6:
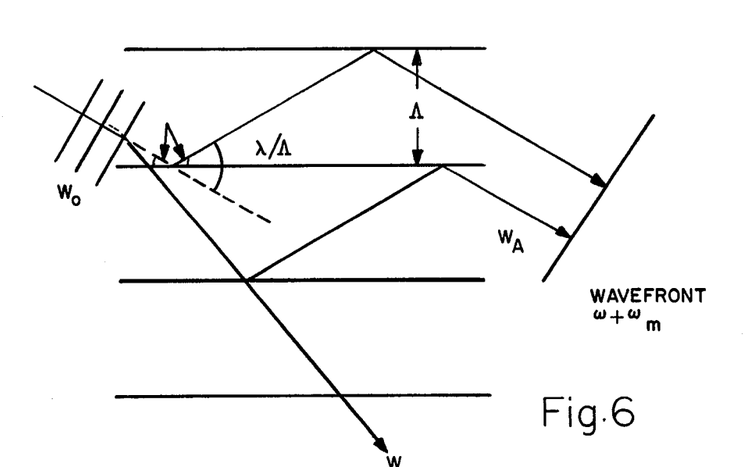
FIG. 6 depicts constructive light interference as it occurs in the present acousto-optical imaging invention.

In this latter regard, it can be demonstrated that when operating in the Bragg regime, transmission of light waves through the acoustic column in such a way that the light waves impact the column at the Bragg angle for a selected light sideband whose order satisfies the Bragg equation (6) for that particular column, has two effects which are highly beneficial in the present acousto-optical imaging invention. One of these effects is that the selected sideband experiences constructive interference and hence reenforcemnt as it passes through the acoustic column, as depicted in FIG. 6. The other effect is that the remaining sidebands which do not satisfy the Bragg condition for the acoustic column undergo conversion or transformation to the order of the selected sideband. As a result, the light energy of the selected sideband emerging from the acoustic column represents a greater percentage of the total available light energy incident on the column. This greater light energy of the selected emerging sideband results in correspondingly increased image intensity.

With the foregoing discussion of light-sound wave interaction in mind, consider again the situation depicted in FIG. 2. It will be observed that the traveling light waves $W_o$ and the acoustic waves $W_A$ impinge or intersect one another at various angles as they propagate through the acoustic medium. From the preceding discussion, it will be understood that diffraction of the light waves by the acoustic waves occurs within all regions of the light-sound wave interaction zone and that maximum defraction occurs within those regions wherein the light waves impinge the acoustic waves at the Bragg angle corresponding to the wavelengths of the light and acoustic waves in the acoustic medium. These Bragg regions are designated in FIG. 2 as $R_1$, $R_2$, and $R_3$. If the refracted light rays from these Bragg regions are traced back or extended, it will be found that they intersect at point $O'$ and thus define a virtual image of the acoustic source $S$. Assume now a number of separate acoustic sources rather than a single source as depicted in FIG. 2. In this case, the acoustic waves from the several point sources combine to produce a resultant complex acoustic wave pattern containing information defining the several sources. The refracted light rays which emanate from the Bragg regions of the complex acoustic waves define multiple virtual images of the several acoustic sources. If the refracted light rays are focused in a viewing plane, real images of the acoustic sources will be produced in the image plane. It can be demonstrated that this imaging technique results in image magnification according to the equation $$M = (\lambda/\Lambda) \qquad (9)$$

This means if two point acoustic source $S_1$ and $S_2$ are separated by the distances $\overline{S_1 S_2}$, their images will be separated by the distance $M(\overline{S_1 S_2}) = \lambda/\Lambda\ (\overline{S_1 S_2})$.

The present invention utilizes the above discussed phenomena of light-sound wave interaction and acousto-optical imaging to produce an observable image of the object 12 in FIG. 1. Thus, it will be understood from the description to this point that the acoustic waves W from the acoustic source 20 are transmitted to the object 12 and then reflected from the object back to the wave coupler 16 in the form of reflected waves $W_R$. The waves incident on the object are scattered or distorted at each point within the object in a manner such that each point becomes, effectively, a separate point acoustic source. The acoustic waves from these separate point sources combine to produce the distorted reflected acoustic waves $W_R$ which thus contain acoustic information defining an image of the object. The reflected waves returning to the wave coupler 16 are transmitted into the acoustic medium 18 in a manner to be explained presently, such that the distorted acoustic waves $W_A$ thereby created in the medium have essentially the same complex wave pattern and hence contain the same image information as the reflected waves $W_R$. The light beam L from the light source 14 is directed through the wave coupler in the manner explained below so as to cause Bragg reflection of the light wave from each of the distorted acoustic wave fronts. Accordingly, the light which emerges from the wave coupler is composed of the light carrier frequency and two or more light sidebands, depending upon the various factors discussed earlier. Each emerging sideband contains information defining an image of the object. In the embodiment of the invention illustrated in FIG. 1, the emerging light waves pass through the optical system 22 which magnifies the light rays of a selected emerging sideband to produce in the viewing plane P an observable image I of the object. The focusing means 28 may be adjusted to image within the viewing plane P any selected cross-sectional plane of the object.

The present acousto-optical echo imaging technique is capable of a great variety of applications. Moreover, the physical arrangement of acousto-optical echo imaging system, and the makeup of its various components, may vary from one application to another. The particular inventive embodiment selected for illustration in FIG. 1 is an underwater sonar system wherein the acoustic wave transmission body 35 is a body of water in which is submerged the object 12 to be examined. The acousto-optical echo imaging apparatus 10 is carried by a marine vessel B which may be a surface ship or submarine. The acoustic transducer 32 is an emitting sonar transducer installed on the hull of the vessel in contact with the water 35. Also mounted on the hull in contact with the water is a sonar receiving transducer 32a which is connected through an electronic receiving circuit 32b to a transducer 32c mounted on an endwall of the wave coupler tank 30. In actual practice, the emitting transducer 32 and the receiving transducer 32a may be the same transducer. The apparatus 10 is so arranged that the acoustic waves W from the emitting transducer 32 are transmitted through the water 35 to the object 12, and the acoustic waves $W_R$ are reflected from the object back through the water to the receiving transducer 32a. The reflected waves actuate the receiving transducer, and thereby the wave coupler transducer 32c through the receiving circuit 32b, to produce within the coupler acoustic medium 18 the distorted acoustic waves $W_A$. In this instance, the acoustic medium 18 is a liquid, such as water, contained within the transparent wave coupler tank 30. The light source 14 and the optical system 22 are situated at opposite sides of the tank 30 in such a way that the light waves from the light source pass through the tank and its contained acoustic medium and then through the optical system.

It will be understood by those versed in the art that the light utilized in the present acousto-optical imaging system is preferably monochromatic light. In the particular inventive embodiment illustrated, for example, the light source 14 comprises a laser source. It will be further evident that Bragg reflection of the monochromatic light waves from the distorted acoustic waves $W_A$ within the acoustic medium 18 requires impact of the distorted acoustic wave fronts by the light wave fronts at the correct oblique angle of incidence with is preferably the Bragg angle. According to the disclosure in the earlier mentioned Adler patent, such Bragg reflection is accomplished by using a laser light source having its propagation axis oriented at the Bragg angle relative to the propagation vector of the acoustic waves through the acoustic medium. This particular method of achieving Bragg reflection has two disadvantages when considered for use in the present acousto-optical system. First, because the laser beam is collimated, Bragg reflection would occur at only a relatively small number of points of each acoustic wave front, thus resulting in an image of poor quality. In other words, the laser beam is composed of parallel light rays all of which would impact the column of distorted acoustic waves $W_A$ at the same angle relative to the propagation vector of the acoustic waves in the column. As a consequence, Bragg reflection of the light rays from the acoustic wave fronts would occur only at those relatively few points, i.e. Bragg regions, where the local acoustic wave front region is oriented at the Bragg angle relative to the propagation vector of the laser beam. Stated another way, a particular local acoustic wave front region, to constitute a Bragg region, must be oriented precisely at the Bragg angle relative to the laser beam axis. Secondly, the Adler technique requires precise orientation of the laser axis relative to the propagation axis of the acoustic waves through the acoustic medium 18. This precise orientation is extremely difficult to both obtain and maintain.

According to a feature of the copending invention, the stated disadvantages of the Adler technique of achieving Bragg reflection are avoided by utilizing a tapered light beam, such as the conical beam 24 in FIG. 1, composed of non-parallel light rays which impact the column of distorted acoustic waves $W_A$ through a range of angles related to the taper angle of the light beam. In this case, in order for a particular local acoustic wave front region to constitute a Bragg region for effecting Bragg reflection of the incident light beam, it is only necessary that the angular attitude of that region, relative to the propagation axis of light beam, fall within a range of angles equal to the taper angle of the light beam. In other words, any local acoustic wave front region whose angle relative to the light beam axis falls within this angular range will provide a Bragg region at which Bragg reflection will occur as the wave front travels through the light-sound wave interaction zone. As a consequence, the present tapered light beam results in Bragg reflection at a relatively large number of points or regions of the distorted acoustic wave fronts $W_A$ and produces a relatively high quality image.

Such a tapered light beam may be obtained in various ways. FIG. 1 illustrates one method. In this case, the collimated light beam L emerging from the laser light source 24 passes through a first diverging lens 36a which spreads the beam to produce a divergent conical beam D. Following the diverging lens is a converging lens 36b which condenses the divergent beam D to a convergent conical beam C. Conical light beam C passes through the wave coupler or Bragg cell 16 and in the absence of any acoustic wave disturbance or other disturbance in the acoustic medium would emerge from the coupler as a single beam which would come to focus at a point beyond the coupler.

It will now be understood that the light which emerges from the wave coupler 16 is composed of the light beam carrier and light sidebands whose number and order will depend on the width of the acoustic column and the angles at which the light rays of the convergent beam impact the acoustic column. It is further evident that each light sideband produced by the light-sound wave interaction has its own Bragg angle. If the taper or cone angle of the light beam is relatively large, the rays of the beam will impact the acoustic column at the Bragg angles for a number of different light sidebands. Under these conditions, these several sidebands will experience constructive interference, and the remaining sidebands which do not satisfy the Bragg equation (6) will undergo transformation to the sidebands whose Bragg angles of reflection fall within the light beam angle. As a consequence, several light sidebands would emerge from the wave coupler 16, and the light energy in each emerging sideband, which is the light energy available for imaging, would represent a correspondingly reduced fraction of the total available light energy from the light source. According to the preferred practice of the invention, the taper or cone angle of the light beam is made sufficiently small to encompass the Bragg angle of reflection of the first order sidebands only. Under these conditions, the higher order sidebands will be transformed to the first order and the first order sidebands will experience constructive interference. As a consequence, the light energy of each first order sideband emerging from the wave coupler 16 and available for imaging will represent a relatively large fraction of the total available energy of the light source, and the intensity of the resulting image will be correspondingly increased.

Since only one of the emerging first order sidebands is used for imaging, it is desirable to blackout the light beam carrier and the other emerging first order sideband. In the particular embodiment of the invention illustrated in FIG. 1, this is accomplished by placing an opaque mask 38 behind the first lens 26a of the magnifying optical system 22 in such a way as to intercept the light beam carrier and one first order sideband. The remaining sideband is permitted to pass through the optical system to produce in the viewing plane P the observable image I of the object 12. As noted earlier, the focus of the optical system may be adjusted by the focus adjustment means 28 to image in the viewing plane any selected cross-sectional plane of the object.

Figure 7:
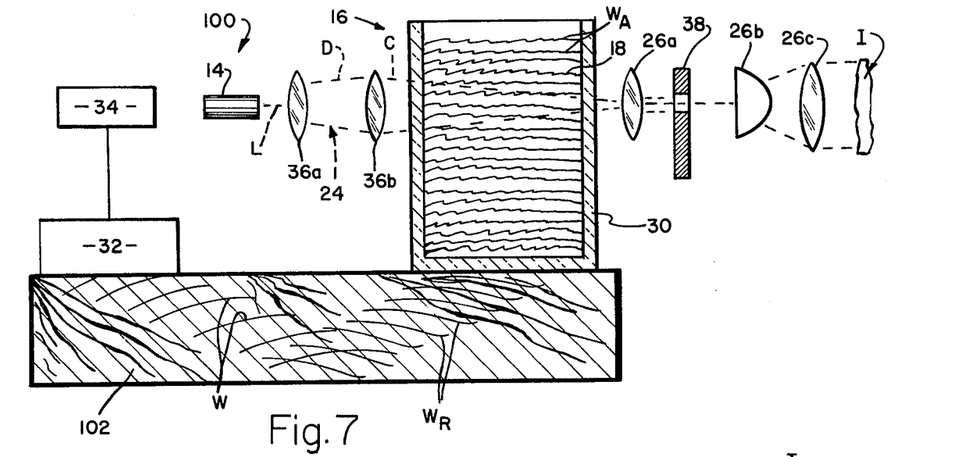
FIG. 7 diagrammatically illustrates a modified acousto-optical echo imaging system according to the invention.

In the inventive embodiment described above, the wave coupler 16 and acoustic energy source 20 are acoustically coupled to the object 12 to be examined indirectly through the acoustic wave transmission body 35. FIG. 7 illustrates an alternative acousto-optical imaging system 100 according to the invention wherein the acoustic source 20 and wave coupler 16 are disposed side-by-side and effectively directly coupled to the object 102 under examination by direct contact with a surface of the object. If desired, the wave coupler may have an open bottom and be sealed to the surface of the object so as to place the acoustic medium 18 in direct contact with the object. In this case, the acoustic waves W from the acoustic source are transmitted directly into and travel through the object. The distorted acoustic waves $W_R$ reflecting from points within the object return to the wave coupler and produce equivalent distorted acoustic waves $W_A$ in the acoustic medium 18 within the coupler. It will be immediately evident from the earlier discussion that the reflected waves $W_R$ and hence the waves $W_A$ within the acoustic medium 18 contain acoustic information defining an image of the interior of the object. The imaging system 100 is thus effective to produce an observable image of the object interior and may be utilized, for example, to inspect parts, particularly large parts, for flaws or other surface or interior formations and the like.

Figures 8, 8A:
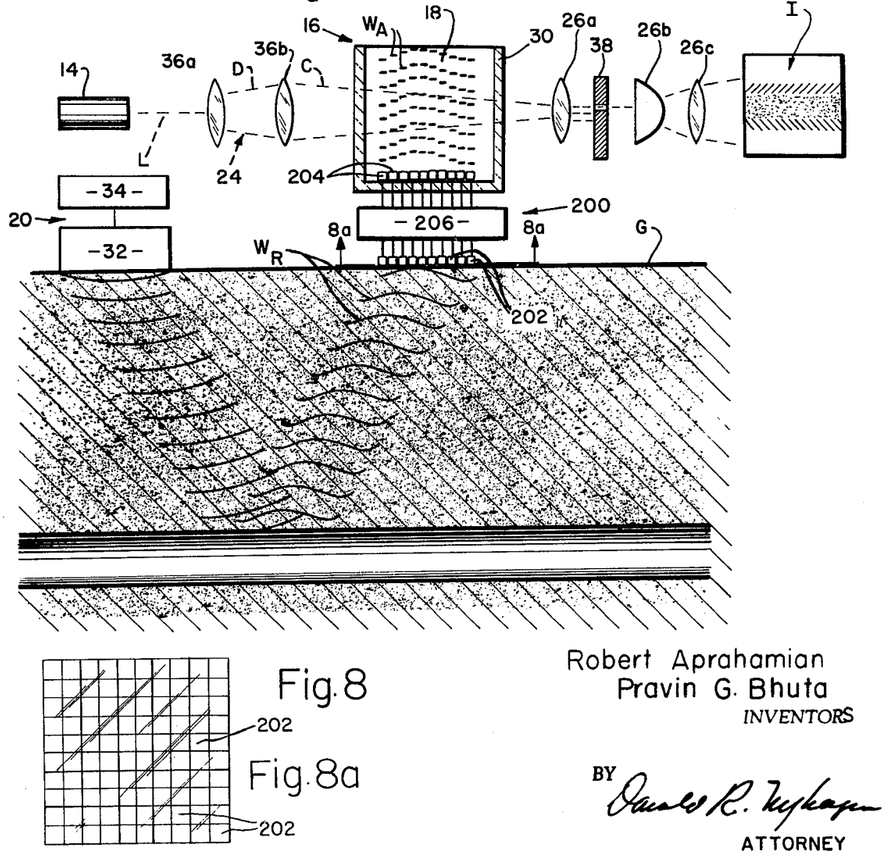
FIG. 8 illustrates a further modified acousto-optical echo imaging system according to the invention.
FIG. 8A is a figure looking in the direction of the arrows on line 8-A of FIG. 8.

FIG. 8 illustrates on particularly useful application of the present acousto-optical echo imaging technique which involves inspection of a ground area for subterranean formations, such as oil and other mineral deposits, strata, tunnels, and the like. In this case, the acoustic source 20 and wave coupler 16 are arranged side-by-side on the surface of the ground G in such a way that acoustic waves from the source are transmitted into the ground and then reflected back to the wave coupler, in much the same manner as in the embodiment of FIG. 7. The imaging system thus produces an image of the underlying subterranean ground formation.

The echo imaging system under discussion, however, presents an acoustic attenuation problem with which a further aspect of the invention is concerned. This attenuation problem resides in the fact that relatively high acoustic frequencies experience rapid attenuation in soils as compared to relatively low acoustic frequencies. Accordingly, it is desirable if not essential to employ in the acousto-optical echo imaging system of FIG. 7 an acoustic source 20 which generates relatively low frequency acoustic wave energy on the order of 1 to 2 Kc. The use of such low frequency acoustic energy, however, presents three difficulties. First, satisfaction of the Bragg condition (equation 6) requires the rise of a prohibitively long wave coupler or Bragg cell. Secondly, the image magnification factor (equation 9) is such that the resulting image would be too small for magnification to an observable size with conventional optics. Finally, separation from the light carrier of the light sideband used for imaging is extremely difficult.

The present invention overcomes these difficulties by a unique image reconstruction technique which permits the use of low frequency (i.e. 1 to 2 Kc) acoustic energy for probing the subterranean area to be examined and yet achieves an image of reasonable size with a wave coupler of practical length and without a carrier sideband separation problem. This technique involves the use of an acoustic wave converter 200 for transforming the low frequency distorted reflected waves $W_R$ returning to the wave coupler 16 to generally equivalent acoustic waves $W_A$ within the acoustic medium 18 having a higher frequency suitable for acousto-optical translation of the acoustic image information to an observable image.

The acoustic wave converter 200 comprises a matrix of receiving transducers 202, a matrix of emitting transducers 204 equal in number to the receiving transducers, and a frequency modulator or multiplier circuit 206 which connects each receiving transducer to the corresponding emitting transducer. The receiving transducers 202 are acoustically coupled to the ground, as by placement in contact with the ground. The emitting transducers 204 are acoustically coupled to the acoustic medium 18 within the wave coupler 16, as by placement within the coupler tank 30, as shown. From this description, it will be understood that the reflected waves $W_R$ returning from the subterranean region being examined to the surface actuate the receiving transducers. The outputs of these transducers actuate the emitting transducers through the intervening frequency modulator or multiplier. The emitting transducers produce corresponding acoustic waves $W_A$ within the acoustic medium. The frequency modulator or multiplier modulates the output of each receiving transducer to a selected higher frequency suitable for acousto-optical image translation.

It will now be understood that the acoustic wave converter 200 operates, in effect, to receive the distorted reflected acoustic waves $W_R$ which return from the substerranean formations and contain acoustic information defining an image of such formation and to reconstruct these waves, or at least close approximations thereof, at a higher frequency in the form of the distorted acoustic waves $W_A$ within the wave coupler 16. The distorted waves thus also contain acoustic information defining an image of the subterranean formations. This acoustic information is then transformed into a corresponding optical image by the light-sound wave interaction discribed earlier. The greater the number of transducers in the receiving and emitting transducer matrices or arrays, of course, the closer will correspond the reconstructed high frequency wave fronts $W_A$ to the reflected wave fronts $W_R$ and hence the higher will be the quality of the resulting image. It is obvious that the present acoustic image reconstruction process may be utilized in other forms and applications of the invention, such as those of FIGS. 1 and 7.

Figure 9:
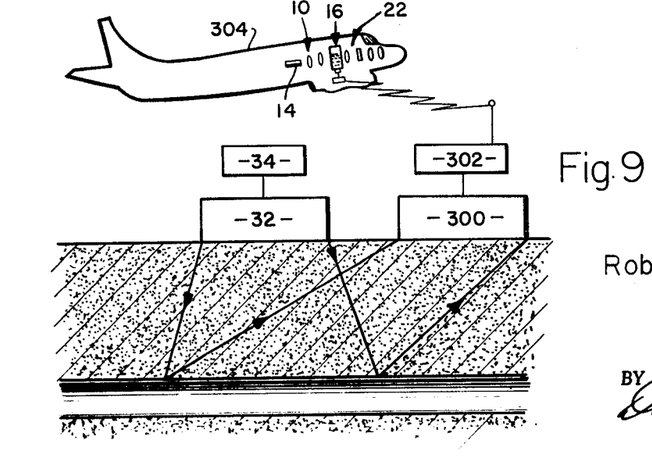
FIG. 9 illustrates a further modified acousto-optical echo imaging system according to the invention.

In the inventive embodiments discussed thus far, transformation of the distorted acoustic image information to an optical image occurs at the same location at which the reflected acoustic waves are received from the object being examined. In some cases, it may be desirable or essential to process the reflected acoustic information to an optical image at a remote location. This may be accomplished by transmitting the output of the acoustic receiver or detector, i.e. the receiving transducer or transducers, to the remote location either through a transmission line or a radio link. In FIG. 9, for example, the output of the acoustic detector 300 is fed to a transmitter 302 from which the acoustic information is transmitted to an aircraft 304 containing acousto-optical image transformation equipment, that is the receiving transducer or transducers, wave coupler, light source, and optics. Alternatively, the information might be recorded on the aircraft for later translation to an optical image at a remote ground station.

What is claimed as new in support of letters patent is:

1. The acousto-optical echo imaging method of imaging an object which comprises the steps of:

selecting a source of light of given frequency, an acoustic wave coupler containing an acoustic wave transmission medium transparent to said light, and a source of acoustic wave energy of given frequency;

transmitting acoustic wave energy from said acoustic source to said object in a manner such that said wave energy is reflected from said object as distorted reflected acoustic waves which contain acoustic information defining an image of said object;

receiving and utilizing the reflected waves to produce in said acoustic medium acoustic waves containing essentially the same acoustic image information as said reflected waves; and projecting a beam of said light from said light source through said medium in a manner such that the light wave fronts of said light beam impinge the wave fronts of said acoustic waves within said medium at an oblique angle to produce refraction of the incident light waves by said latter acoustic waves, whereby the light emerging from said medium is composed of refracted light waves defining an image of said object.

2. The acousto-optical echo imaging method of claim 1, including the additional step of:
passing said emerging refracted light waves through an optical magnifying system to produce an observable image of said object within a viewing plane.

3. The acousto-optical echo imaging method of claim 1, wherein:
said object is contained within an acoustic wave transmission body, and said acoustic wave energy is transmitted through said body to said object and then reflected back through said body.

4. The acousto-optical echo imaging method of claim 3, wherein:
said body is a body of water or a suitable liquid.

5. The acousto-optical echo imaging method of claim 1, wherein:
said object is the ground, and said acoustic wave energy is transmitted from the ground surface through the ground and then reflected back through the ground to the surface.

6. The acousto-optical echo imaging method of claim 1, wherein:
said utilizing step involves converting said reflected waves to corresponding electrical signals, transmitting said signals to a remote imaging station, and converting said electrical signals at said imaging station to said acoustic waves within said medium.

7. The acousto-optical echo imaging method of claim 1, wherein:
said transmitted acoustic wave energy has a relatively low frequency; and
said utilizing step involves converting said reflected waves to corresponding electrical signals, modulating said signals to a higher frequency, and converting said higher frequency signals to said acoustic waves within said acoustic medium.

8. The acousto-optical echo imaging method of claim 1, wherein:
said transmitted acoustic wave energy has a relatively low frequency; and said utilizing step involves receiving said reflected waves with an array of separate transducers, each of which generates an electrical signal corresponding to the incident reflected wave energy, modulating the signal from each transducer to a higher frequency, utilizing said higher frequency signals to drive a similar array of emitting acoustic transducers acoustically coupled to said acoustic medium.

9. The acousto-optical method of imaging an object which comprises the steps of:
selecting a source of light of given frequency, an acoustic wave coupler containing an acoustic wave transmission medium transparent to said light, and a source of acoustic wave energy of given frequency;

transmitting acoustic wave energy from said acoustic source through said object to produce distorted acoustic waves which contain acoustic information defining an image of said object;

converting the distorted waves to corresponding electrical signals, transmitting said signals to a remote imaging station, and converting said electrical signals to equivalent acoustic waves within said acoustic medium at said imaging station; and projecting a beam of said light from said light source through said medium in a manner such that the wave fronts of said light beam impinge the wave fronts of said equivalent distorted acoustic waves within said medium at an oblique angle to produce refraction of the incident light waves by said latter acoustic waves, whereby the light emerging from said zone is composed of refracted light waves defining an image of said object.

10. The acousto-optical method of imaging an object which comprises the steps of:
selecting a source of light of given frequency, an acoustic wave coupler containing an acoustic wave transmission medium transparent to said light, and a source of acoustic wave energy of relatively low frequency;

transmitting acoustic wave energy from said acoustic source through said object to produce distorted acoustic waves which contain acoustic information defining an image of said object;

converting said distorted acoustic waves to corresponding electrical signals, modulating said electrical signals to a higher frequency, and converting said higher frequency signals to equivalent acoustic waves within said acoustic medium; and projecting a beam of said light from said light source through said medium in a manner such that the wave fronts of said light beam impinge the wave fronts of said equivalent distorted acoustic waves within said medium at an oblique angle to produce refraction of the incident light waves by said latter acoustic waves, whereby the light emerging from said zone is composed of refracted light waves defining an image of said object.

11. An acousto-optical echo imaging system for imaging an object comprising:
a source of light of given frequency;
a wave coupler containing an acoustic wave transmission medium transparent to said light;

means including an acoustic source for transmitting acoustic wave energy of given frequency from said acoustic source to said object in a manner such that said wave energy is reflected from said object as distorted reflected acoustic waves which contain acoustic information defining an image of said object;

means for receiving and utilizing the reflected waves to produce in said acoustic medium generally equivalent distorted acoustic waves containing essentially the same acoustic image information as said reflected waves; and means for projecting a beam of said light from said light source through said medium in a manner such that the wave fronts of said light beam impinge the wave fronts of said acoustic waves within said acoustic medium at an oblique angle to induce refraction of the incident light waves by said latter acoustic waves, whereby the light emerging from said medium is composed of refracted light waves defining an image of said object.

12. The acousto-optical echo imaging system of claim 11, including:

an optical system situated in the path of the emerging light rays for producing an observable image of said object in a viewing plane.

13. The acousto-optical echo imaging system of claim 11, wherein:

said object is contained within an acoustic wave transmission body; and said acoustic source is acoustically coupled to said body in a manner such that said acoustic wave energy is transmitted through said body to said object and then reflected back through said body to said receiving and utilizing means.

14. The acousto-optical echo imaging system of claim 11, wherein:

said object is the ground; and said acoustic source and receiving and utilizing means are located at the ground surface.

15. The acousto-optical echo imaging system of claim 11, wherein:

said receiving and utilizing means comprise transducer means for receiving and converting said reflected waves to corresponding electrical signals, means for transmitting said signals to a remote imaging station, and transducer means acoustically coupled to said acoustic medium at said imaging station and actuated by said electrical signals for converting said electrical signals to said acoustic waves within said medium.

16. The acousto-optical echo imaging system of claim 11, wherein:

said transmitted acoustic wave energy has a relatively low frequency;

said receiving and utilizing means comprise transducer means at said station for receiving said reflected waves and converting said reflected waves to corresponding electrical signals, modulating means for modulating said signals to a higher frequency, and transducer means acoustically coupled to said acoustic medium and actuated by said higher frequency signals to convert the latter signals to said acoustic waves within said medium.

17. The acousto-optical echo imaging system of claim 11, wherein:

said transmitted acoustic wave energy has a relatively low frequency; and said receiving and utilizing means comprise an array of separate acoustic transducers for receiving the reflected acoustic waves, each transducer generating electrical signals corresponding to the incident reflected wave energy, modulating means for modulating the signals from said transducers to a higher frequency, and a similar array of transducers acoustically coupled to said acoustic medium and actuated by said higher frequency signals for converting the latter signals to said acoustic waves within said medium.

* * * * *